United States Patent [19]

Akrabawi

[11] Patent Number: 4,566,257
[45] Date of Patent: Jan. 28, 1986

[54] LAWN MOWER DISPOSABLE GRASS COLLECTION BAG ATTACHMENT

[76] Inventor: Mohammad Akrabawi, 1625 Carlisle La., DeKalb, Ill. 60115

[21] Appl. No.: 626,460

[22] Filed: Jun. 29, 1984

[51] Int. Cl.$^4$ .......................................... A01D 35/22
[52] U.S. Cl. ...................................... 56/202; 56/320.2
[58] Field of Search ..................... 56/202, 16.6, 320.2; 141/390, 10, 286, 285, 231

[56] References Cited

U.S. PATENT DOCUMENTS

| | | | |
|---|---|---|---|
| 3,777,461 | 12/1973 | Girard | 56/202 |
| 3,805,500 | 4/1974 | Sweet | 56/202 |
| 3,916,608 | 11/1975 | Garrison | 56/202 |
| 3,961,467 | 6/1976 | Carpenter | 56/202 |
| 4,233,806 | 11/1980 | Richardson | 56/320.2 |
| 4,377,063 | 3/1983 | Leaphart | 56/202 |
| 4,399,647 | 8/1983 | Soldavini | 56/202 |
| 4,413,467 | 11/1983 | Arizpe | 56/202 |
| 4,444,002 | 4/1984 | Heismann et al. | 56/202 |

Primary Examiner—Gene Mancene
Assistant Examiner—John G. Weiss
Attorney, Agent, or Firm—Richard G. Kinney

[57] ABSTRACT

An improvement for a lawn mower of the type that propels clippings and a stream of air from its cutting area which improvement allows it to collect the clippings in a horizontally disposed plastic trash bag is disclosured. Transfer means, a plate with an opening sized to the mower discharge chute, is releasably mounted on the mower against the chute to receive the clipping and stream of air and pass them through it in one direction. The plate defines a vent opening to allow air to vent in the opposite direction and has means for releasably affixing the disposable bag's opening's marginal areas in a generally vertical plane such that the bag encloses both the vent and clipping openings, so that clipping and air air propelled into the horizontally disposable bag and air is vented from it. Several embodiments of transfer plate are disclosed to retrofit different mowers and several embodiments of different means for affixing the bag are disclosed including a rectangular bracket that sandwiches the plastic against a conformingly shaped channel in the plate and is held there by spring clips and a horizontal groove or channel that receives a spring loaded chain or shock cord. A safety container is provided mounted to the mower and its handle that supports and substantially surrounds the plastic bag. This container has its top formed to be openable so as to be able to remove filled bags and replace new ones. The safety container has a pocket for holding and carrying a supply of empty plastic trash bags.

8 Claims, 15 Drawing Figures

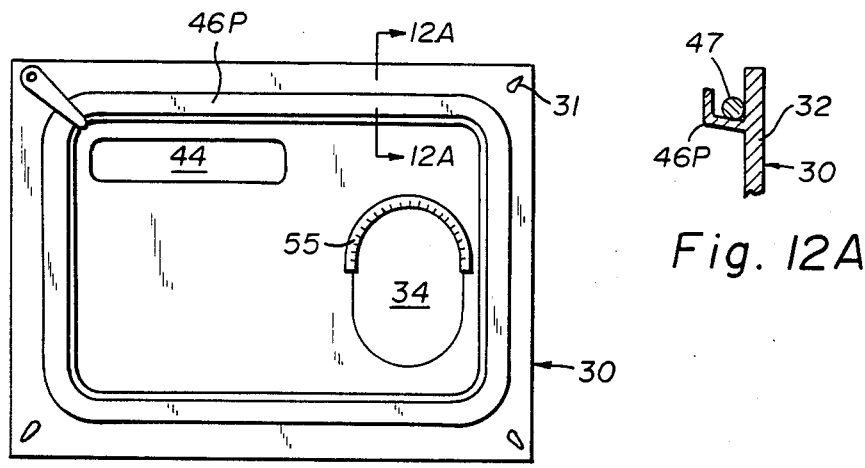
Fig. 12
Fig. 12A
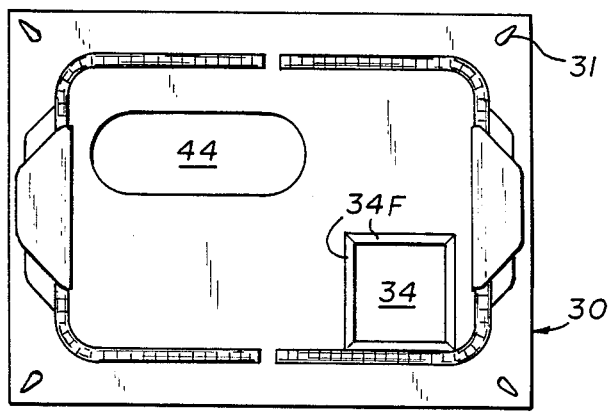
Fig. 13
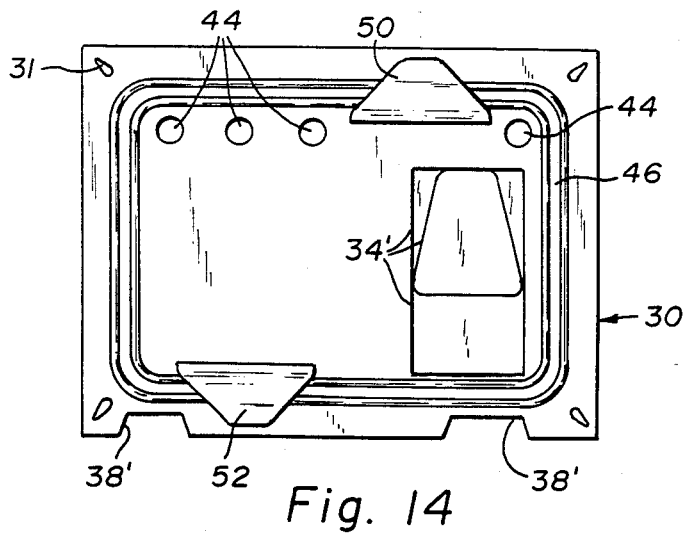
Fig. 14

LAWN MOWER DISPOSABLE GRASS COLLECTION BAG ATTACHMENT

FIELD OF THE INVENTION

The present invention is directed to an improvement in lawn mowers and is especially directed to an improved grass clippings collector attachment.

BACKGROUND OF THE INVENTION

Lawn mowers and especially powered rotary lawn mowers have been provided with grass clipping collecting compartments or catchers for receiving clippings. During use of the mower its operational cutting elements propel the clippings from the operational or cutting area through a discharge chute or opening into a container, usually a cloth bag reinforced with a steel wire frame mounted rearward of the mower proper. In use the mower is operated until the bag or container is more or less full and then it is detached from the mower, emptied, e.g. into a garbage can, or disposable trash bag and replaced for re-use.

Frequent emptying of conventional grass catchers into stationary containers is often a time consuming, bulky and awkward process. Clippings are often spilled and require extra effort to collect. And the conventional grass clipping handling process often loosens the clipping material creating a larger volume and resulting in greater problems in handling and disposing of it.

SUMMARY OF THE INVENTION

To overcome these disadvantages the present invention provides an attachment for use with lawn mowers which comprises transfer plate, adapted to be secured to the mower and defining a receiving opening sized and shaped to the exit chute or opening of the mower and which, when secured, commutes with that opening and receives substantially all of the clippings expelled therefrom. Vent means formed in the transfer plate are provided for venting air. Means for releasably securing a disposable plastic bag, preferably a standard size plastic trash bag, to the transfer plate such that the bag encloses the opening and vent so that during use clipping and air from the exit chute or opening are transferred by the transfer plate to the disposable bag wherein the clipping are accumulated and the air vented out of the vent. The plastic bag when filled can be easily removed and it and its contents conveniently disposed of by the operator.

An additional feature of the invention is the providing of a safety container or shield which is sized to receive the disposable bag and is secured to the mower handle. The container may be releasably opened to admit the bag and closed over the bag and fastened (e.g. with Velcro fasteners) so as to provide support to the disposable bag and to stop any propelled hard material, such as rocks, bones, or wood pieces that may be encountered in mowing a lawn.

The invention has advantages over conventional grass clippings handling. The use of the one-step bagging of clippings saves both time and labor. The invention eliminates any need to personally handle the clipping material from the time of collection to the time of disposal as the clippings never leave the original plastic bag. As a result, labor is saved, aggravation is avoided and time is utilized more efficiently.

The invention is easy to use as a plastic bag is quickly installed, the clippings collected without frequent stoppage, release of the plastic bag is done in one step, and immediate disposal of the filled bag is possible. This operation may be accomplished in a short period of time.

The invention is economic as it utilizes the plastic disposal bag to its fullest capacity. The force of the air into the bag at the time of mowing compacts the grass clipping material as contrasted with the conventional handling process which often loosens the clipping material during transfer operations, creating a larger volume of which to dispose. Also with the invention the additional expense for equipment (e.g. garbage cans) to hold open plastic bags for manual filling is eliminated.

Thus the invention achieves all or most of the advantages achieved by some vacuum cleaners but does so without the need for separate additional equipment and its expense.

The invention, together with the advantages thereof, may best be understood by reference to the following description taken in connection with the accompanying drawings, in the several figures of which, like reference numerals identify like elements.

BRIEF DESCRIPTION OF THE FIGURES

FIGS. 12 and 13 are vertical plan views of two other alternatives constructions for the transfer plate.

FIG. 12A is a fragmentary sectional view of the plate of FIG. 12 as seen from the line 12A—12A of FIG. 12, looking in the direction of the arrows.

FIG. 14 is a view similar to that of FIGS. 12 and 13 of yet another alternative construction, in this case it is a kit for retrofiting to one of a number of different mowers.

DETAILED DESCRIPTION

Figure 1:
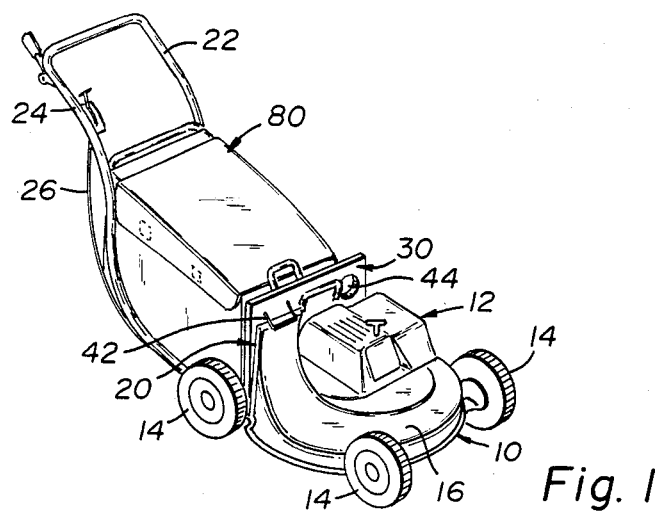
FIG. 1 is a perspective view of a conventional lawn mower modified with a novel attachment constructed in accordance with the present invention.

Refering to FIG. 1, there is depicted a lawn mower generally referenced by the number 10. The particular mower 10 is of the gasoline powered type although as will be later clear from this disclosure, the invention may be employed with many different types of lawn mowers. Even though of general applicability, for specificity and not for limitation, we will here describe it in a specific environment of use.

The mower 10 is of the conventional rotary cutter blade type having a gasoline engine 12, a set of four wheels 14 set more or less at the corners of its blade cowling 16. The blade (not shown) is driven by the engine 12 beneath the cowling 16 to cut grass and propel the clippings out an exit chute or opening 20. The mower 10 has a rearward extending tubular handle 22 and controls 24 which are connected to the mower proper by the cables 26.

The mower 10 as thus described may be entirely conventional and thus need not be detailed further here.

Figure 2:
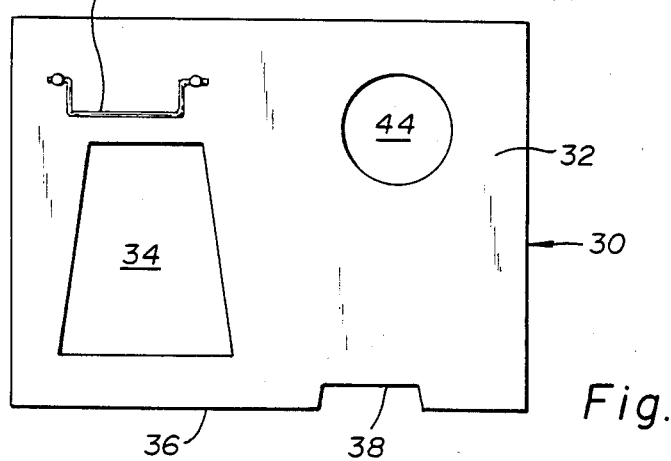
FIG. 2 is a elevational front view of one part of the attachment of FIG. 1, namely the transfer plate.

In accordance with the present invention, the mower 10 is provided with a novel transfer plate 30 and safety container 80. The transfer plate 30, as can better be seen from FIGS. 2-4, comprises a more or less flat sheet 32 having a clipping receiving opening 34 sized and shaped to conform with the discharge chute and to receive impelled air and clipping therefrom.

The transfer plate has its bottom edge 36 shaped to conform to the top surface of the mower 10 at the place of the opening from the chute 20 and e.g. for a Jacobsen brand, model No. S 21 P would need a small cut-out 38. Many mowers, as commercially available, include brackets or slots for receiving conventional attachments and the transfer unit 30 can be easily adapted to fit into these. For example, the aforesaid Jacobsen model has a pair of upstanding brackets which form a slot for receiving vertical members at either side, and the transfer plate 30 is made to drop into these slots. (Of course, for other mowers the transfer unit may be made to conform to the mower's configuration and fit its brackets or else additional brackets may be installed.)

To secure the plate 30 in close approximate to and about the chute 20 a hook unit 40 (FIGS. 12 and 1) is provided that is secured to a hook 42 (FIG. 1) affixed to the top of the chute 20 (FIG. 1).

A vent hole 44 is formed in the plate 30 at a location which is clear from obstructions when the plate 30 is mounted on the mower 10.

Figure 3:
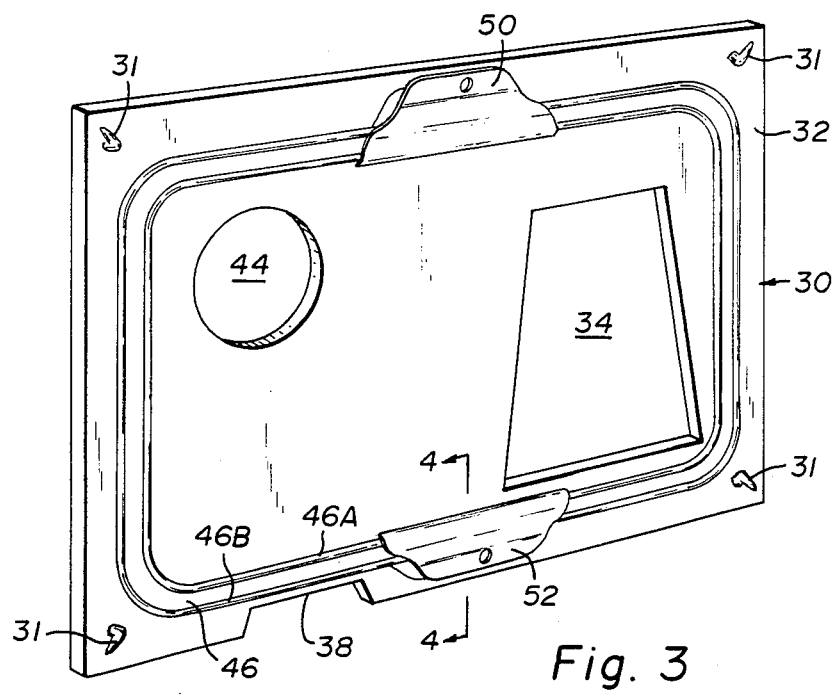
FIG. 3 is a rear view of the transfer plate of FIG. 2.
Figure 4:
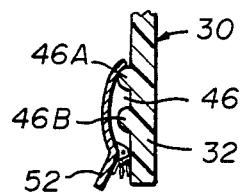
FIG. 4 is an enlarged sectional partial view of the plate of FIGS. 2 and 3 as seen from the line 4—4 in FIG. 3, looking in the direction of the arrows.

As shown in FIG. 3, the rear of the transfer plate 30 is provided with a rectilinear groove or channel 46 which is formed by a pair of spaced apart projecting ridges 46A and 46B.

Figure 5:
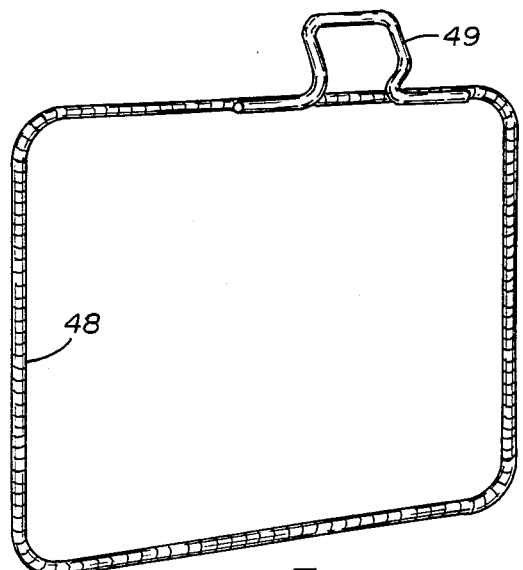
FIG. 5 is a perspective view of another part of the attached of FIG. 1, namely a channel bracket that engages with the rear of the transfer plate of FIGS. 2–4.
Figure 6:
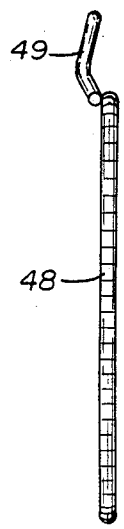
FIG. 6 is a side view of the bracket of FIG. 5.

The ridges 46A and 46B are sized and shaped to receive between them a rigid bracket 48 shown in FIGS. 5 and 6. The bracket 48 preferably has a handle 49 that projects from and is off-set from the plane of the bracket 48 so as not to contact the plate 30 when in use. The bracket 48 is releasably secured in place by means of a pair of spring clips 50, 52 (FIGS. 3 and 4) mounted to the plate 30.

Figure 7:
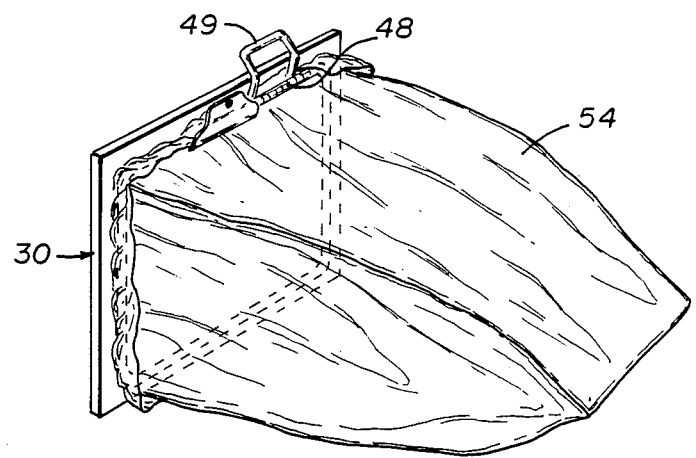
FIG. 7 is a perspective view of the bracket of FIGS. 5 and 6, partly shown in phantom lines, and a disposable plastic bag shown in their operational relationship, mounted to the transfer plate of FIGS. 2–4.

The function of the bracket 48 channel 46 and clips 50, 52 is to secure in a tight fit the marginal edge about the opening of disposable bags such as the bag 54 of FIG. 7. FIG. 7 illustrates the manner of positioning the bag 54 about and over the bracket 48. With the edge of the opening so secured the bracket 48 is secured in the channel 46 by first lifting up one spring loaded clip e.g. the bottom clip 52, and inserting the bottom of the bracket (and plastic bag) and then lifting the top clip 50 and inserting the bracket under it. (Sufficient play in the bracket is provided to allow the bracket to bend slightly so as to more easily fit under the clip 50). Once inserted the bracket is seated in the channel 46 and held therein by the clips 50, 52, thus sandwiching the bag 54 between it and the channel. As shown in FIG. 3, a set of optional outward pointing hooks 31 may be provided at the corners of the rearward side of the plate 30. The plastic bag's edge may be hooked over these to aid in holding it in place while inserting bracket 48.

The bag thus opens onto the rectangular area of the plate 30 bounded by the channel 46. Note, (FIG. 2) that the openings 34 and 44 are thus in communication with the interior of the bag 54 and now comprise its only entry and exit. Except for these the bag is closed by the transfer plate 30.

Figure 8:
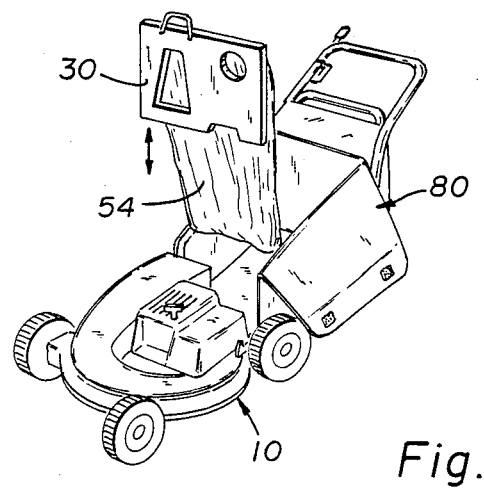
FIG. 8 is a perspective view of the assembled plastic bag and transfer plate being installed into the mower of FIG. 1.
Figure 9:
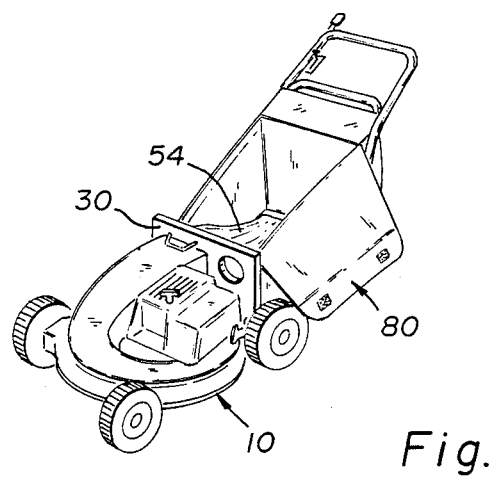
FIG. 9 is view similar to that at FIG. 7 illustrating the plate and empty bags being affixed in place in the mower.
Figure 10:
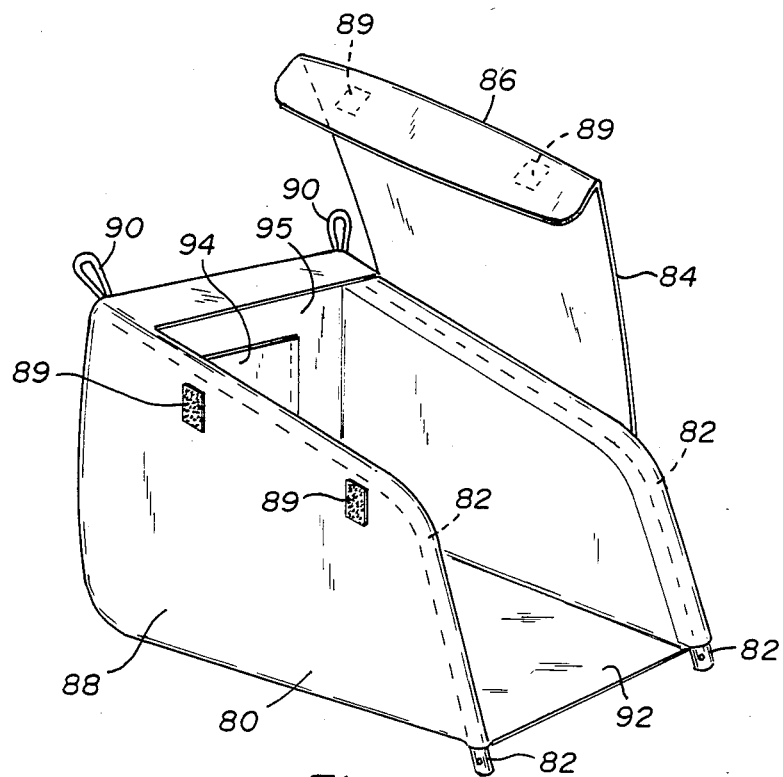
FIG. 10 is a perspective view of another part, the safety container, of the mower of FIGS. 1, 8 and 9.

This operation of loading the bag into the transfer plate 30 can be performed quickly and easily and is preferably done when the plate 30 is removed from the mower 10. The result, as shown in FIG. 8 is the transfer plate 30 with the bag 54 affixed. This combination is then inserted in the mower 10, with the safety container 80, opened, as shown in FIG. 9, so that the bag 54 is within the safety container 80. As can best be seen from FIG. 10 the safety container 80 includes a rigid frame 82 that is preferably a generally U-shaped single member of thin wall tubular steel, aluminium or other metal.

The safety container 80 proper is preferably made of canvas and sewn about the frame 82 and includes a cover 84 hinged at one side to open as to substantially expose the interior for loading and unloading of the plastic bag 54 therein. The cover 84 preferably includes a flap 86 that overlaps the side 88 at its upper portion and is secured by a pair of fabric hook and loop fasteners 89 such as are commonly available under the Trademark Velcro.

The safety container 80 is approximately the shape of many conventional clipping bags but is preferably permanently installed to the mower. It is preferably larger than that of conventionally used removable clipping bags. It is secured to the mower handle by loops. The bottom 92 of the container is preferably formed of a reinforced with stiff sheet material such as hardboard to help maintain the containers shape.

A pocket 94, opening upward, is provided in the rear wall 95 of the container 80. This pocket is sized so as to conveniently hold a number of folded disposable bags 54.

The invention has been described in one particular embodiment. It can be readily applied to other embodiments. FIGS. 11 through 14 represent alternative structures for the transfer plate 30 wherein it is adapted to different mowers employs vent means 44 of differing kinds, and employs different means for securing the bag 54 such that its opening covers the transfer opening 34 and vent 44.

Figure 11:
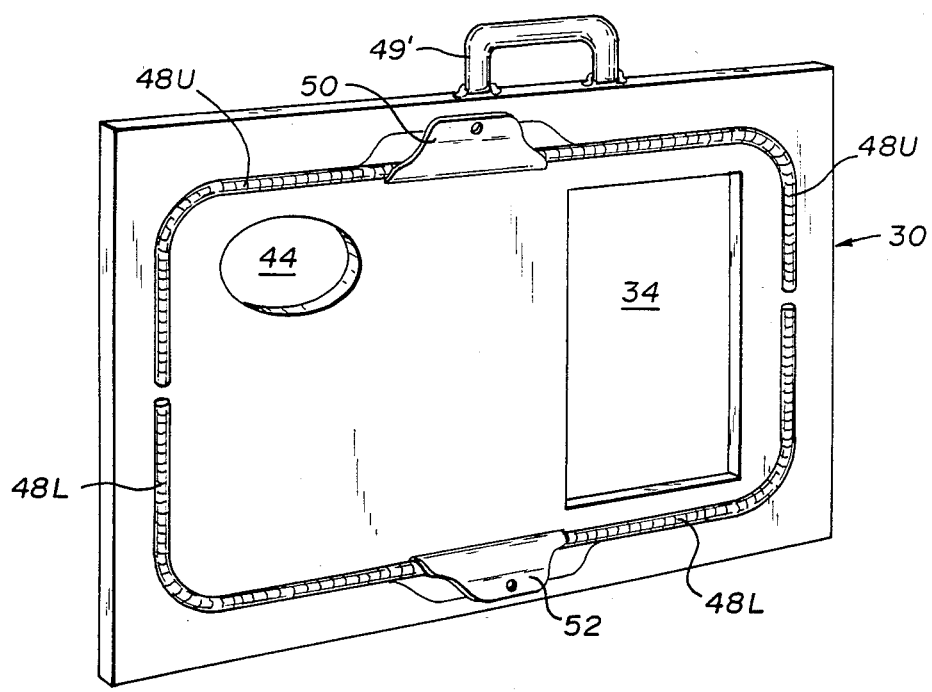
FIG. 11 is a perspective view of an alternative construction for the transfer plate.

In FIG. 11 the bracket 48 is eliminated and the bag 54 secured instead by means of two generally U-shaped brackets 48U and 48L which affixed to move with spring clips 50' and 52'. In this case the marginal edge of the bag 54 is pushed under the brackets 48U and 48L and held there. For ease of handling a handle 49' is provided.

In FIG. 12 a projecting channel 46P projects out from an opening outward of the plate 30 is provided. In this channel a spring loaded chain or shock cord 47 (FIG. 12A) can be used to secure the bag 54 in place. The transfer opening 34 may be provided with a flexible or rigid partial rim 55 made of rubber or metal or durable plastic or the like. The rim 55 projects outward for conforming to and fitting against a chute.

FIG. 13 shows a plate 30 like that of FIG. 11 but with the U-shaped brackets arrayed left and right and with a projecting transfer funnel 34F so as to accommodate a particular exit chute.

In FIG. 14 further alternative transfer plate 30 kit is shown which is provided with prescored knock-out groove 38′ 34′ so that the plate can be easily adapted to any of a number of different mowers by the user. The full kit would comprise the plate of FIG. 14 a bracket similar to that of bracket 48 (FIGS. 5-6) and the safety compartment 80 of FIG. 10.

A prototype substantially similar to that of FIG. 1 was constructed and tested in use and performed satisfactory. This prototype had a plate of made of ⅜ inch thick plywood about 13 to 17 and ½ inches in overall dimensions with an vent opening about 3 and ½ inches in diameter and a clipping transfer opening about 5 and ¼ inches by 7 and ½ inches. The channel 46 was formed by affixing a split rubber tube to the surface. The bracket 48 was about 11 and ½ by 15 and ½ inches and was formed of 5/16 inch bar stock of malleable steel. The clips 50 and 52 were removed from commercial clipboards and reused. The safety container was, in inches, about 11 by 30 at its bottom, 15 by 25 at its top, and had a height of 11 inches in front and 20 inches in back. The bottom was reinforced with a thick waterproof cardboard sheet of about 13 and ½ by 30 inches. Although this prototype functioned successfully, the preferred production model of the invention would use other materials as described above.

As should now be appreciated the transfer plate 30 and means for holding the bag 54 can be of many arrangements and shapes so long as it serves to releasably secure the disposable bag 54 about the vent and transfer opening and conforms closely to the chute or clipping exit so as to receive the discharge therefrom.

In some mowers, a safety gate is provided over the chute or exit which is opened by a bracket mounted on the conventional catcher bag. Such mowers may be easily accommodated by providing a similar bracket on the plate 30 for keeping that gate open when it is affixed to the mower.

In addition, for side chute mowers and others a short length of flexible tubing may be provided extending like the funnel 34F and opening into the disposable bag opening and adapted to fit securely thereto. For these mowers the safety container 80 may, if preferred, be mounted to the side of the mower.

While several particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

I claim:

1. An attachment for a lawn mower of the type that propels clippings from an operating zone through a discharge opening, comprising:
   transfer plate for easy manual releasable attachment to the mower for receiving propelled air and clippings from the mower when attached thereto; and
   means for releasably affixing the marginal edge of the opening of a disposable bag to said transfer plate such that the bag receives the propelled air and clippings from said manually releasable transfer plate;
   said manually releasable transfer plate also including vent means for allowing air to be vented from the disposable bag;
   such that when attached to an operating lawn mower with a disposable bag so affixed, clippings are propelled through the transfer plate into the disposable bag and there accumulated so that they can be disposed of and removed by manually removing the transfer plate and its attached disposable bag, and thereafter detaching the filled bag from the transfer plate away from the lawn mower.

2. The attachment of claim 1, wherein:
   the transfer means defines an opening substantially conforming to the mower discharge opening; and said vent means is a vent formed in the transfer means from the disposable bag to the ambient athmosphere.

3. The attachment of claim 2, wherein:
   the transfer means is a plate of relatively air impervial material with a said opening substantially conforming to the mower discharge opening therethrough and also a vent opening therethrough as said vent;
   the disposable bag affixing means being such as to secure the marginal area of the bag to one side of said plate surrounding said openings therethrough.

4. The attachment of claim 3 wherein:
   said plate has defined on it a rectilinear channel (46) as part of said bag affixing means and said last named means includes a rectilinear frame (48) sized and shaped to fit into said rectilinear channel with the marginal edge of the opening of the bag sandwiched between it and said channel and further including manually releasable mechanical bias means (50, 52) for holding in and urging said frame (48) toward the channel for captivating and securing the marginal portion of the bag opening therebetween.

5. A lawn mower comprising:
   a grass cutting mechanism that in use propels clippings and air out of a discharge chute,
   transfer means releasably mounted to the chute having means for releasable securing a disposable clippings trash bag thereto such that the bag encloses on the transfer means, said transfer means communicating the discharge chute with the interior of the bag and having vent means for venting air out of the bag, so that air and clippings may be propelled into the bag and air vented out of the bag and the clippings accumulated in the disposable bag said transfer means being manually demountable from the mower; and
   a safety container substantially surrounding the bag and being of sufficient strength so as to resist and retain any hard objects propelled into the bag and to support the bag during filling; and wherein:
   said transfer means is generally vertically disposed plate having a receiving opening sized and shaped to the chute and a vent opening positioned at the upper part of the enclosed bag, wherein, during use, the clippings and air are being directed through said plate in one direction and the air being vented out of the plate in opposite direction; and said bag is secured to the plate so as to lie generally horizontally during use.

6. The lawn mower of claim 5, wherein:
   said plate is releasably affixed to the mower so that it and its attached bag can be easy removed from the mower for disposable of a filled bag and the reaffixing of an empty bag.

7. A kit for retrofitting a lawn mower of the type that in use propels clipping out of an exit area, so it is able to use disposable plastic trash bags as clipping catcher bags, comprising:

a transfer plate having a vent opening and being capable of having a clipping receiving opening formed there-through, said plate including means for manually releasably attaching it to the mower such that one side of the plate is adjacent to the mower clipping exit area; and means for manually releasably securing the opening of a disposable plastic trash bag at the other side of the plate such that it will surround and enclose the vent opening and the clipping receiving opening.

8. The kit of claim 7 for use in retrofitting a lawn mower of the type that has a rearward handle, which further includes a safety and support container having means for affixing it to the handle and the mower, such container being constructed of relatively strong material and sized and shaped so as to surround the plastic trash bag when installed to the transfer plate and said container including means for opening and closing it so as to allow easy access to the bag and transfer plate for installing fresh bags and removed filled bags.

* * * * *

UNITED STATES PATENT OFFICE
CERTIFICATE OF CORRECTION

PATENT NO. : 4,566,257
DATED : January 28, 1986
INVENTOR(S) : Mohammad Akrabawi

It is certified that error appears in the above-identified patent and that said Letters Patent are hereby corrected as shown below:

IN THE SPECIFICATION:

Column 5, line 13, change "13 to 17" to --13 by 17--.

IN THE CLAIMS:

Column 8, line 12, change "removed" to --removing--.

Signed and Sealed this

Twenty-seventh Day of May 1986

[SEAL]

Attest:

DONALD J. QUIGG

Attesting Officer

Commissioner of Patents and Trademarks